United States Patent [19]
Bednarski et al.

[11] 3,859,193
[45] Jan. 7, 1975

[54] APPARATUS FOR COULOMETRIC STRIPPING ANALYSIS

[75] Inventors: Theodore M. Bednarski; Harold Hauer, both of Wilmington, Del.

[73] Assignee: Hercules Incorporated, Wilmington, Del.

[22] Filed: Nov. 20, 1973

[21] Appl. No.: 417,688

[52] U.S. Cl. ........... 204/195 H, 204/1 T, 204/195 F, 204/212
[51] Int. Cl. ..................... G01n 27/42, G01n 27/46
[58] Field of Search ............ 204/1 T, 195 R, 195 H, 204/195 F, 212

[56] References Cited
UNITED STATES PATENTS

| | | | |
|---|---|---|---|
| 2,651,612 | 9/1953 | Haller | 204/195 R |
| 3,281,348 | 10/1966 | Schumacher et al. | 204/195 H |
| 3,438,875 | 4/1969 | Watanabe et al. | 204/195 F |
| 3,694,338 | 9/1972 | Weingarten | 204/195 R |

OTHER PUBLICATIONS
"Analytical Chemistry," Vol. 43, No. 11, Sept., 1971, pp. 1398-1405.
"Analytical Chemistry," Vol. 45, No. 6, May, 1973, pp. 840-844.

*Primary Examiner*—T. Tung
*Attorney, Agent, or Firm*—Edith A. Rice; John W. Whitson

[57] ABSTRACT

This invention relates to a unique system for coulometric stripping analysis. The system is characterized by a rotating, mercury-coated pyrolytic graphite working electrode-electrolysis cell and a unique reference electrode-counter electrode structure. The working electrode-electrolysis cell is prepared from a container, usually in the form of a cylinder or crucible, comprising conventional graphite coated with pyrolytic graphite. The interior surface of pyrolytic graphite is hydrogen terminated, then mercurated to provide a chemically modified surface which contains chemically bound mercury-containing groups. Mercury is then electroplated onto the modified surface to provide a thin, continuous, coherent film. Coulometric stripping analysis using this system can detect metals and other electroactive species in solutions in the parts per billion range in relatively short analysis times.

2 Claims, 3 Drawing Figures

3,859,193

APPARATUS FOR COULOMETRIC STRIPPING ANALYSIS

BACKGROUND OF THE INVENTION

This invention relates to a unique system for coulometric analysis of trace amounts of electroactive species in solution at concentrations in the parts per billion range.

Stripping voltammetry is a highly sensitive electroanalytical technique that can be used to quantitatively detect trace metals and other electroactive species in solution. Stripping voltammetry is a two-step process comprising electrodepositing the electroactive material of interest on or in an indicating or working electrode and then electrodissolving or stripping the deposited material back into solution. In anodic stripping voltammetry the working electrode is made negative with respect to a reference electrode in the deposition step so that the cations or other reducible species are reduced and deposited at the electrode. The stripping step is accomplished by making the working electrode increasingly more positive from the initial plating potential, and selectively reoxidizing the electroactive material while concomitantly measuring the resulting current. As each electroactive species is electrodissolved a sharp change in current results at that potential, due to the change of concentration of the solution. The concentration of the metal ion, or electroactive species, is calculated from the potential-current peaks of the potential versus current graph charted during the stripping step. Cathodic stripping voltammetry is the corresponding process in which the electroactive species of interest comprise anions or oxidizable species. In this case the reverse potentials, as compared with anodic stripping voltammetry, are used during the plating and stripping steps.

In conventional anodic or cathodic stripping voltammetric analysis electrodeposition is carried out under carefully controlled conditions of stirring rate and time. Only a small fraction of the electroactive species is electrodeposited from the sample, the amount being dependent on the concentration of the sample, and the diffusion rate under the conditions employed. The magnitude of the potential-current peaks obtained in the stripping step provides a measure of the amount deposited which is proportional to that originally present in the sample. Standard solutions must be employed to relate the measured current to the sample solution concentration.

Coulometric stripping voltammetric analysis differs from conventional stripping voltammetry in that essentially all of the electroactive species of interest in the solution are electrodeposited at the working electrode. Thus the current-potential peaks obtained in the stripping step provide a direct measure of the concentration of the electroactive species of interest in the sample. The use of standard solutions is not required.

SUMMARY OF THE INVENTION

It has now been found that coulometric analysis can be conducted using a unique system characterized by a rotating, mercury-coated pyrolytic graphite working electrode-electrolysis cell, a unique reference electrode-counter electrode structure, with a small distance maintained between the reference electrodecounter electrode structure and the rotating graphite electrode-electrolysis cell, a means for retaining the sample within the cell at high rotational velocities, an efficient means for removing dissolved oxygen from the sample solution and means for reproducibly aligning the components. In accordance with this invention there is provided an apparatus for coulometric stripping analysis which comprises (a) a rotatable working electrode-electrolysis cell comprising a pyrolytic graphite-coated graphite container having an interior coating of a thin, continuous coherent film of mercury; (b) means connected to said electrode-electrolysis cell for rotating the cell; (c) conductive means for connecting said electrode-electrolysis cell to an electrode terminal; (d) a reference electrode-counter electrode structure comprising a hollow tube of a semi-porous rigid insulator, closed at one end, and containing an aqueous solution of an electrolyte in contact with a reference electrode terminal and an inert metal counter electrode attached to the exterior surface of said hollow tube, said reference electrode-counter electrode structure being movably mounted above said electrode-electrolysis cell and capable of being inserted into said electrode-electrolysis cell so that a space of about 2 to about 4 millimeters is provided between said electrode-electrolysis cell and said reference electrode-counter electrode structure; (e) means for reproducibly aligning said electrode-electrolysis cell and said reference electrode-counter electrode structure; and (f) means for introducing a gas into the space between the electrode-electrolysis cell and said reference electrode-counter electrode structure.

DETAILED DESCRIPTION OF THE INVENTION

The rotating mercury-coated working electrode-electrolysis cell is prepared from a chemically modified pyrolytic graphitecoated graphite container which is preferably in the form of a hollow cylinder closed at one end or a crucible.

Graphite is a crystalline form of carbon characterized by a crystal pattern of parallel layers of sheet-like structures composed of interconnected planar hexagonal rings each containing six carbon atoms. The plane defined by the sheets of interconnected hexagonal rings is known as the ab basal plane. In the ring structure each carbon atom is linked to three equidistant carbon atoms. At the edge of each sheet are peripheral carbon atoms which are each attached to only two other carbon atoms. These peripheral carbon atoms are usually terminated with a "foreign atom" such as, for example, hydrogen, oxygen, or sulfur.

Pyrolytic graphite is a particular form of graphite in which the individual crystallites show definite orientation, their ab basal planes being substantially parallel to one another. The electrode-electrolysis cell used in this invention is produced by coating pyrolytic graphite on the surface of a conventional graphite container in a manner such that the ab basal planes of the coating are substantially parallel to the surface of the container. Pyrolytic graphite may be produced on the surface by depositing carbon formed by pyrolysis of carbonaceous material, such as low molecular weight hydrocarbons, on the graphite surface usually at temperatures between 1,700 and 2,500°C. and at relatively low pressures. To obtain a higher degree of orientation of the crystallites, the resulting graphite structures can be subjected to further thermal treatment, optionally under stress, at elevated temperatures above the pyrolysis temperature. To prepare the electrode-electrolysis cell of this invention the conventional graphite container is coated with a layer of pyrolytic graphite preferably from about 1.5 to about 2 mils thick and composed of individual crystallites having an average size of about 100 to about 500 A, with about 90 percent of the crystallites being oriented with their ab basal planes parallel to the graphite surface.

To prepare the electrode-electrolysis cell the interior pyrolytic graphite surface is hydrogen-terminated, mercurated and then electroplated with mercury. First the surface is pretreated to remove "foreign atoms" attached to the peripheral carbon atoms of the individual crystallites. This step can be accomplished by heating the pyrolytic graphite at temperatures of about 1,000°C. in an inert atmosphere. The pretreated graphite surface is then hydrogenated to terminate at least some of the peripheral carbon atoms with hydrogen. The hydrogenation step is carried out by known hydrogenation techniques. For example, the graphite surface, after the heating step to remove "foreign atoms" can be cooled in the inert atmosphere to a temperature of from about 625 to 725°C., preferably about 675°C., and then treated with hydrogen and further cooled in an inert or hydrogen atmosphere.

The resulting hydrogenated graphite surface is then treated with mercury (II) ions under conditions similar to those for mercuration of aromatic hydrocarbons. These conditions are similar to those for electrophilic substitution by mercury (II) ions. A typical method for this mercuation is to contact the hydrogenated graphite surface with a solution of a mercury (II) salt, such as the acetate, nitrate, or perchlorate, in a suitable reaction medium for electrophilic substitution reactions. Reaction media which can be used include acids such as acetic, acetic-perchloric, trifluoroacetic and methane sulfonic acid. The presence of water reduces the rate of reaction of the mercury (II) ions with the hydrogenated surface. Acid anhydrides can be added to the acid solution to reduce this effect of water. The mercuration is continued until from about $9 \times 10^{-12}$ to about $1.3 \times 10^{-9}$ gram atoms of mercury per geometric square centimeter of graphite surface have replaced some of the terminating hydrogen atoms, thus producing a surface having mercury-containing groups chemically bound to peripheral carbon atoms. The time required for this degree of mercuration varies with the reaction system used. In general, a solution of mercury (II) ions in acidic solvents generally requires a contact time from about 5 minutes to about 30 minutes. The mercurated surface then is washed with water and an aqueous solution containing complexing ions such as chloride ions to solubilize and remove any physically occluded mercury (II) ions. Other known methods of mercuration of aromatic hydrocarbons can also be used. The hydrogen-terminated-mercurated graphite surface is stable to oxidation and can be stored in this form for subsequent use.

The resulting chemically modified interior surface of the graphite container is coated with a thin, continuous, coherent mercury film by electrodeposition of mercury (II) ions from an aqueous solution. The chemically bound mercury-containing groups serve as nucleation sites for the electrodeposition of mercury on the modified graphite surface. The electrodeposition is conducted in the unique system of this invention by placing the electroplating solution directly into the graphite container which now serves as an electrode-electrolysis cell. The electroplating solution comprises an aqueous solution of mercury ions or complexed ions prepared by dissolving a mercury salt such as the acetate, nitrate or perchlorate in aqueous medium. A salt ionizable in aqueous solution is added to increase the conductivity for the electrodeposition process and to prevent hydrolysis of the mercury salt. Such ionizable salts include potassium chloride, sodium chloride, calcium nitrate and any other water-soluble salt with cations which are not readily reducible.

To effect electrodeposition, the reference electrodecounter electrode structure is placed in its operating position, the electroplating solution is deoxygenated and the graphite surface is potentiostatted at a potential negative with respect to the reference electrode. Potentials from about $-0.5$ to about $-1.0$ volts versus the reference electrode are preferred. The graphite surface is maintained at the negative potential for a period of time sufficient to deposit between about $1.4 \times 10^{-4}$ and $2.8 \times 10^{-3}$ grams of mercury per square centimeter of exposed graphite surface. The thickness of the mercury film thus deposited varies from about 0.1 to about 2 microns, assuming the surface of the graphite to be smooth. The electroplating solution is then removed. An aqueous solution of an ionizable salt, for example, the same salt that was used as the electrolyte in the electroplating solution, is added to the electrode-electrolysis cell. The graphite surface is again potentiostatted at a negative potential with respect to the reference electrode to reduce any physically absorbed or occluded mercury ions. The resulting structure is a thin, continuous, coherent film of mercury supported on the interior surface of the pyrolytic graphite-coated graphite container. The mercury-coated graphite container can be used as a working electrode-electrolysis cell in coulometric stripping voltammetry as described below. The coherent mercury film is stable for several days if kept in contact with oxygen-free water, but rapidly degrades if dried and stored in air.

BRIEF DESCRIPTION OF THE DRAWINGS

More specifically, FIG. 1 illustrates a typical current versus potential chart obtained in the stripping step of an anodic coulometric stripping analysis conducted in accordance with this invention. In this graph, the horizontal axis indicates the potential, in volts, as the working electrode is made increasingly more positive, with respect to the saturated calomel reference electrode (SCE), from the plating potential. The vertical axis represents the anodic current, in microamperes, at the indicated potential. The peaks of the current versus potential curves indicate the sharp change in current due to the change in concentration of each electroactive species in the mercury film as it is stripped from the working electrode. Since the potential at which a particular electroactive species is stripped from the working electrode is characteristic of the particular species, the electroactive species present in the sample are readily identified. Also, since substantially all of each electroactive species in the sample is deposited at the working electrode during the plating step, the areas under the peaks are directly related to the total amount of and thus to the concentration of each electroactive species in the sample solution. Therefore, the need for comparison with standards is not required.

FIG. 2 shows a typical analytical system in accordance with this invention. In FIG. 2, the pyrolytic graphite coated graphite container 10, the interior surface of which has been chemically modified and electroplated with mercury, as described above, serves as the electrolysis cell for receiving the sample solution as well as the working electrode. The graphite container 10 is mounted on a rotating chuck 12 which is connected to a motor 14 which rotates the graphite container 10 at high speed. The graphite container 10 is also connected by means of a conducting rod 16 to an electrode terminal which in this specific embodiment is a mercury pool 18. The reference electrode-counter electrode structure is positioned above the graphite container and when in operating position is inserted into the container and into contact with the sample solution. The reference electrode-counter electrode structure comprises a reference electrode which consists of a tube 22 made of a suitable semi-porous, rigid insulator, for example, Thirsty Glass$^{TM}$ (trademark of Corning Glass Works), the upper portion of which is covered with a polytetrafluoroethylene sheath, containing an aqueous electrolyte, such as, potassium chloride solution. A reference electrode terminal 20, which is a silver wire, is in contact with an aqueous electrolyte solution. A spiral 24 of an inert metal such as platinum is painted on or otherwise attached to the outside of the tube 22 and acts as the auxiliary or counter electrode.

Figure 1:
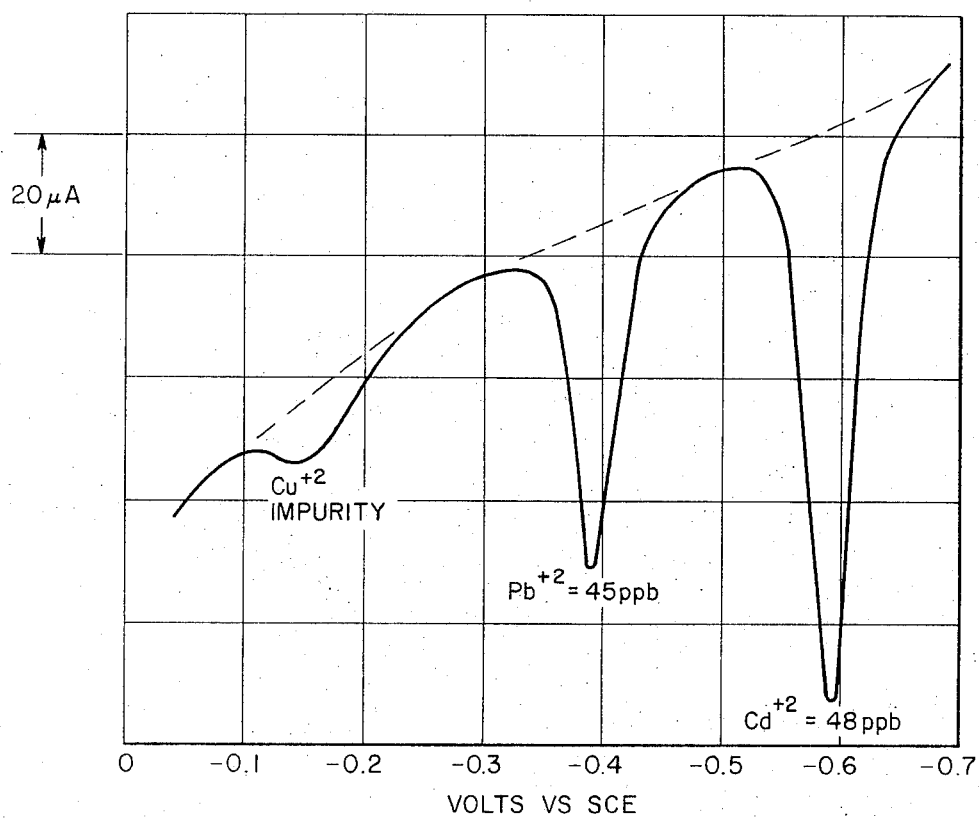
FIG. 1 shows the current in microamperes, $\mu A$, versus the potential in volts versus a saturated calomel reference electrode, (SCE), obtained in a typical coulometric stripping analysis.

The proper alignment of the reference electrode-counter electrode structure with respect to the working electrode-electrolysis cell is maintained by means of a square vertical rod 28 to which the working electrode-electrolysis cell is fixed. The reference electrode-counter electrode structure is mounted on the rod 28 such that motion in the vertical but not horizontal direction is permitted. This permits the insertion of the reference electrode-counter electrode structure into the electrode-electrolysis cell such that the space between them is maintained at from about 2 to about 4 millimeters. A stainless steel, hollow needle 26 is provided in the reference electrode-counter electrode support structure 27 to permit the introduction of an inert gas, such as nitrogen or argon, over the top of the cell when the reference electrode-counter electrode structure is in operating position.

The elimination of air dissolved in the sample or in the gas space above the sample is necessary since the presence of oxygen will interfere with accurate analysis. The oxygen is removed readily by passing an inert gas into the air space above the sample. To prevent evaporation of the sample liquid during rotation, the inert gas is saturated with water vapor prior to introduction into the system. To prevent expulsion of the sample solution at high rotational velocities the graphite container 10 is provided with a retaining lip 30 of an inert material, such as a plastic which is not readily wet by aqueous solutions, for example polyethylene, or polytetrafluoroethylene.

Figure 2:
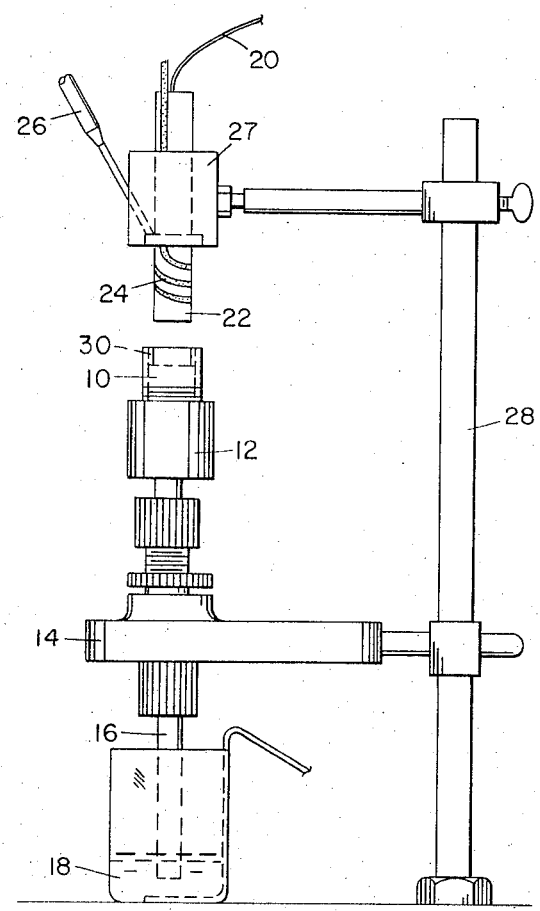
FIG. 2 shows the unique coulometric stripping analysis system in accordance with one aspect of this invention.
Figure 3:
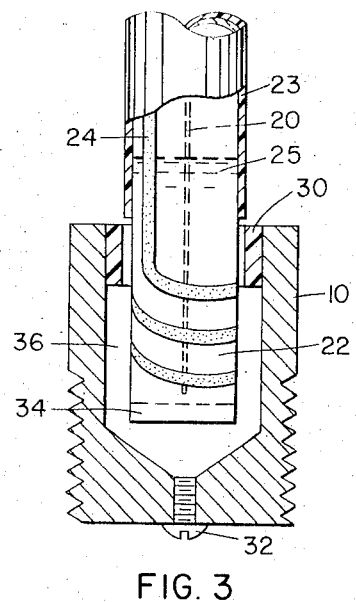
FIG. 3 is an enlarged view of a preferred embodiment of the rotating mercury-coated pyrolytic graphite working electrode-electrolysis cell and the unique reference electrode-counter electrode structure of the coulometric analysis system of this invention in operating position.

In FIG. 3 the graphite container 10 serves as the electrode-electrolysis cell and is externally threaded for connection to the chuck 12 as shown in FIG. 2. The graphite container 10 is in the shape of a crucible which converges to a cone. In preparing the electrode-electrolysis cell, described above, the crucible is first coated with a layer of pyrolytic graphite. It has been found that to insure a continuous pyrolytic graphite coating on a crucible of this shape, a hole is necessary at the apex of the cone. A screw 32 of nylon or other inert material is fitted into this hole to seal the crucible. The graphite container 10 is fitted with a retaining lip 30. The reference electrode-counter electrode combination is fabricated from a tube 22, closed at one end by a glass plate 34 sealed to the tube with epoxy cement. The tube 22 is made of a rigid porous solid insulator, for example a tube of Thirsty Glass (trademark of Corning Glass Works), which is a porous glass more permeable to ions than solvent molecules. The tube contains a saturated potassium chloride aqueous solution 25 and reference electrode 20 is a silver wire conductor. A sheath 23 of plastic material, such as polytetrafluoroethylene, surrounds the tube 22 above the area of the tube which makes contact with the sample solution. The plastic sheath prevents evaporation of water from the aqueous solution 25 through the porous insulating tube 22. The counter electrode 24 is in the form of a platinum of other inert metal contact painted on or otherwise attached to the outside of the tube 22. The tube is mounted in a support structure 27 as shown in FIG. 2. When in operating position the space 36 between the electrode-electrolysis cell and the reference electrode-counter electrode structure is from about 2 to about 4 millimeters. The upper portion of the porous insulator tube is covered with a tightly fitting plastic film, such as polytetrafluoroethylene, to prevent loss of electrolyte by transport upward through the tube. The top of the tube is plugged.

When used for coulometric stripping analysis the electrode-electrolysis cell is rotated during the deposition and the stripping steps at speeds necessary to provide sufficient centrifugal force to spread the sample solution up the mercury-coated walls, thus forming a thin solution layer in contact with the mercury surface. The hspeed of rotation is usually greater than 100 r.p.m. and is preferably 1000–4000 r.p.m. This brings the sample solution volume into direct contact with the working electrode surface, thus maximizing the working electrode area to sample volume ratio. This also results in a thin diffusion layer at the working electrode and convective mass transfer to the electrode surface during the plating step of the stripping analysis, thus minimizing the time required for the deposition of substantially all of the electroactive species of interest. The two electrodes are sized so that the space between the outside of the reference electrode-counter electrode tube and the inside of the mercury-coated graphite working electrode-electrolysis cell is less than about 4 millimeters, preferably less than 2.5 millimeters. Under these conditions of design and operation, complete electrodeposition of electroactive species can be effected in less than 30 minutes and usually in less than five minutes. The small space between the electrodes makes possible utilization of small samples, usually in the range of about 0.5 to 3 milliliters.

When used for anodic coulometric stripping analysis, the graphite container is potentiostatted at potentials sufficiently negative with respect to the silver wire reference electrode to completely deposit the electroactive species of interest. The electroactive material in the sample is reduced and deposited on or in the mercury film. The time required for complete electrodeposition of the electroactive material varies with the solution film thickness, and thus is dependent upon the cell geometry and the speed of rotation. For example, at a concentration of electroactive material in the 10 parts per billion (ppb.) to 10 parts per million (ppm.) range, electrodeposition of the electroactive material requires about 5 minutes when rotation is 1,800 r.p.m., while a speed of 600 r.p.m. requires about 20 minutes when the spacing between the reference electrode-counter electrode structure and the working electrode-electrolysis cell is about 3 millimeters. Following the electrodeposition step, the deposited electroactive material is stripped from the mercury film by progressively making the graphite container more positive with respect to the reference electrode from the initial plating potential while the cell rotation is maintained. The resulting current versus potential curve is similar to that illustrated in FIG. 1 and the concentration of the electroactive materials may be determined directly by measurement of the stripping peak areas and subsequent calculation. Thus it is possible to obtain rapid analysis of small samples containing very low concentrations of electroactive materials without the requirement of calibration with standard solutions.

This improved coulometric stripping analysis method is particularly adaptable for use in the analysis of metal ions at low concentrations in aqueous systems. Metals which can be readily determined include zinc, manganese, chromium, iron, cadmium, cobalt, nickel, tin, lead, copper, and silver. Other types of materials which can be determined by anodic coulometric stripping analysis include those ions of variable oxidation state present as soluble complexes which will form sparingly water-soluble complexes in the reduced state, for example, tin (with diethyl phosphorothiolothionate) and chromium (with hydroxide). Classes of materials which can be determined by cathodic coulometric stripping analysis include ions of variable oxidation state present as watersoluble complexes in the reduced state which form sparingly watersoluble complexes in the oxidized state, for example, thallium and cerium (with hydroxide), nickel (with dimethylglyoxime) and antimony (with Rhodamine C).

While the above discussion has assumed use of aqueous samples, this method of analysis and analytical equipment can be used as well for non-aqueous solutions if they are sufficiently polar to provide the required electrical conductivity.

The coulometric stripping analysis system can be adapted for use in periodic monitoring of electroactive species in process streams. The process stream is provided with an analytical control bypass loop. By introducing a sample into the cell at repeated intervals, and analyzing the sample solution using the improved coulometric stripping technique described above, electroactive species of the process stream can be effectively monitored.

The following examples are illustrative of the preparation of the mercury-lined pyrolytic graphite electrode-electrolysis cell and its use in the unique coulometric stripping analysis of this invention.

EXAMPLE 1

This sample illustrates the preparation of a hydrogen-terminated mercurated nonplaner pyrolytic graphite surface.

A graphite tube having a pyrolytic graphite coating 1.5 to 2.0 mils thick on the interior and exterior surfaces and having the ab basal plane primarily parallel to the tube surface was heated at 1,000°C. for 3 hours in a Vycor (trademark of Corning Glass Works) tube in a highly purified argon stream to effect radical termination of the graphite surface. The tube, 2.54 cm. in length by 1.27 cm. in internal diameter, was then cooled to 675°C. and exposed to highly purified hydrogen gas for 18 hours. The tube was then cooled to room temperature under hydrogen and stored under vacuum for further use. The hydrogen terminated pyrolytic graphite-coated graphite tube was then placed in a 0.1 M mercuric perchlorate - 80 percent (V/V) trifluoroacetic acid - 20 percent (V/V) trifluoroacetic anhydride solution for 15 minutes. The tube was then washed with distilled water until the water washings were of neutral pH and rinsed four times with 20 ml. of an aqueous 2 M KCl solution. The graphite tube was rinsed with distilled water and vacuum dried. The resulting hydrogen-terminated mercurated graphite surface was stable and the tube was stored for subsequent use.

EXAMPLE 2

This example illustrates the application of a thin, continuous, coherent, mercury film to the interior surface of the hydrogen-terminated, mercurated pyrolytic graphite surface prepared in Example 1.

One end of the mercurated graphite tube was sealed with paraffin wax. The tube was then mounted into a ¼ inch Swagelok (trademark of Crawford Fitting Company) union with conventional aluminum ferrules and nut. The Swagelok union was then attached to a shaft rotatable at 600 r.p.m. with a synchronous motor.

A solution of 2.0 ml. of an aqueous 0.5 M KCl solution containing 0.025 M mercuric acetate was added to the graphite tube. A saturated calomel reference electrode (SCE), a platinum wire spiral counter electrode and a polytetrafluoroethylene nitrogen sparge tube were also included, and the system was deoxygenated with nitrogen. The graphite tube was potentiostatted at $-1.0$ volt versus the saturated calomel reference electrode and 6 coulombs of electricity was passed through the cell over a period of 2 minutes. The plating solution was then removed and 2.0 ml. of 1 M potassium chloride was added to the graphite tube. After deoxygenating with nitrogen, the tube was again potentiostatted at $-1.0$ volt versus the saturated calomel reference electrode for 60 seconds to reduce any mercury ions remaining on the surface. The thickness of the mercury film was calculated to be 0.5 micron, assuming the geometrical area of the tube, 9.5 cm.$^2$, to be smooth. The resulting structure was a graphite tube having a thin, continuous, coherent mercury film plated on the interior cylindrical chemically modified graphite surface.

EXAMPLE 3

This example illustrates the use of the cylindrical electrode prepared in Example 2 in the coulometric stripping analysis system of this invention.

The pyrolytic graphite-coated tube containing the mercury film prepared as described in Example 2 was used as the working electrode-electrolysis cell for coulometric anodic stripping analysis. One and eight-tenths milliliter of a standard solution containing 50 ppb. lead (II) ions and 50 ppb. cadmium (II) ions in 0.1 M KCl, adjusted to pH 3 with hydrochloric acid, was added to the graphite tube electrolysis cell. After addition of the complementary electrolysis equipment described in Example 2, the tube was rotated at 600 r.p.m. and the solution was deoxygenated with nitrogen. The graphite tube was then potentiostatted at −0.75 volt versus the saturated calomel electrode for 20 minutes. The nitrogen flow into the cell was then stopped and the graphite tube scanned towards positive potentials at a rate of 2 volts per minute. The resulting current-potential response was recorded and, by integration of the Gaussian-shaped peak, the elemental concentration was calculated directly. Duplicate results showed an average concentration of 45 ppb. for lead (II) and 47 ppb. for cadmium (II).

EXAMPLE 4

This examples illustrates the use of a mercury-coated pyrolytic graphite-coated graphite crucible in the improved coulometric stripping analysis using the apparatus shown in FIG. 2.

The pyrolytic graphite-coated graphite crucible was 2.3 cm. in length and had an outside diameter of 1.90 cm. The internal design of the crucible consisted of a tube 1.27 cm. in diameter extending downward 1.55 cm. from the top of the crucible and then converging to a cone of approximate height of 0.35 cm. A hole, 0.3 cm. in diameter, was tapped in the bottom of the crucible and passed through the apex of the cone. Both the external surface of the crucible and the hole in the bottom of the crucible were machine threaded.

The pyrolytic graphite-coated graphite crucible was hydrogen terminated and mercurated using procedures identical to those described in Example 1. A nylon screw then was fitted into the 0.3 cm. diameter hole in the bottom of the crucible and a retaining lip comprising a polyethylene tube, 1.27 cm. outside diameter and 0.64 cm. in height, was press fit into the top of the crucible. The crucible was then threaded into the rotating chuck 12. To prepare the mercury-plated film, 0.8 ml. of an aqueous 0.5 M KCl solution containing 0.05 M mercuric acetate was added to the graphite crucible. The reference electrode-counter electrode structure, described in FIG. 3, was placed into position and the crucible rotated at 1,800 r.p.m. using a synchronous motor. After deoxygenation was complete, the rotating graphite crucible was potentiostatted at −0.8 volt versus the silver-silver chloride reference electrode until the plating current decreased from the initial reading of 75 milliamperes to less than 1 milliampere. The resulting mercury film was calculated to be 1.0 micron thick, assuming a smooth surface on the exposed graphite surface.

The pyrolytic graphite-coated crucible containing the thin, coherent, continuous mercury film as described above was used as the working electrode for coulometric anodic stripping analysis. Eight-tenths of a milliliter of a standard solution containing 1 part per million (ppm.) lead (II) in 0.1 molar aqueous KCl adjusted to pH 2 was added to the working electrode-electrolysis cell. The reference electrode-counter electrode structure including the nitrogen sparge tube was then placed in operating position and the cell was rotated at 1,800 r.p.m. The working electrodeelectrolysis cell was potentiostatted at −0.7 volt versus the silver-silver chloride reference electrode for 5 minutes. With the cell still rotating, the graphite crucible was then scanned towards positive potentials at a rate of 1 volt per minute. The resulting current-potential response was recorded and by measurement of the peak area and subsequent calculation the solution was shown to contain 1.02 parts per million (ppm.) of lead.

What we claim and desire to protect by Letters Patent is:

1. An apparatus for coulometric stripping analysis which comprises (a) a rotatable working electrode-electrolysis cell comprising a pyrolytic graphite-coated graphite container having an interior coating of a thin, continuous coherent film of mercury; (b) means connected to said electrode-electrolysis cell for rotating the cell; (c) conductive means for connecting said electrode-electrolysis cell to an electrode terminal; (d) a reference electrode-counter electrode structure comprising a hollow tube, of a semi-porous rigid insulator, closed at both rnf, and containing an aqueous solution of an electrolyte in contact with a reference electrode terminal, said terminal, said hollow tube having attached to the exterior surface thereof an inert metal counter electrode, said reference electrode-counter electrode structure being movably mounted above said electrode-electrolysis cell and capable of being inserted into said electrode-electrolysis cell so that a space of about 2 to about 4 millimeters is provided between said electrode-electrolysis cell and said reference electrode-counter electrode structure; (e) means for reproducibly aligning said electrode-electrolysis cell and said reference electrode-counter electrode structure; and (f) means for introducing an inert gas into the space between the electrode-electrolysis cell and said reference electrode-counter electrode structure.

2. An apparatus as set forth in claim 1 wherein the reference electrode-counter electrode structure comprises a hollow tube of semi-porous glass closed at both ends and containing an aqueous solution of potassium chloride solution in contact with a silver wire reference electrode terminal; and a platinum spiral attached to the outside of the hollow tube as the counter electrode.

* * * * *

PO-1050
(5/69)

UNITED STATES PATENT OFFICE
CERTIFICATE OF CORRECTION

Patent No. 3,859,193         Dated January 7, 1975

Inventor(s) Bednarski and Hauer (Case 1)

It is certified that error appears in the above-identified patent and that said Letters Patent are hereby corrected as shown below:

Col. 6, Line 31 of p.p.;
"of" (second occurrence) -- should read -- "or"

Col. 6, Line 47 of p.p.;
"hspeed" -- should read -- "speed"

Col. 10, Line 37 of p.p.;
"rnf" -- should read -- "ends"

Col. 10, Line 38 of p.p.;
"said terminal," -- should be deleted

Signed and sealed this 7th day of April 1975.

(SEAL)
Attest:

RUTH C. MASON
Attesting Officer

C. MARSHALL DANN
Commissioner of Patents
and Trademarks